(12) United States Patent
Sorkin

(10) Patent No.: US 10,857,631 B2
(45) Date of Patent: *Dec. 8, 2020

(54) SPARK CAPTURE SYSTEM FOR USE WITH CUTTING TORCH

(71) Applicant: Felix Sorkin, Stafford, TX (US)

(72) Inventor: Felix Sorkin, Stafford, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/829,422

(22) Filed: Mar. 25, 2020

(65) Prior Publication Data
US 2020/0223018 A1 Jul. 16, 2020

Related U.S. Application Data

(63) Continuation of application No. 15/952,903, filed on Apr. 13, 2018, now Pat. No. 10,639,750.

(Continued)

(51) Int. Cl.
| | |
|---|---|
| *B23K 37/00* | (2006.01) |
| *B23K 10/00* | (2006.01) |
| *B23K 7/00* | (2006.01) |
| *B23K 9/00* | (2006.01) |
| *B23K 9/23* | (2006.01) |
| *B23K 9/013* | (2006.01) |
| *B23K 37/02* | (2006.01) |
| *E04C 5/12* | (2006.01) |
| *F16P 1/02* | (2006.01) |

(Continued)

(52) U.S. Cl.
CPC .......... *B23K 37/006* (2013.01); *B23K 7/005* (2013.01); *B23K 9/0026* (2013.01); *B23K 9/013* (2013.01); *B23K 9/23* (2013.01); *B23K 10/00* (2013.01); *B23K 10/006* (2013.01); *B23K 37/0241* (2013.01); *E04C 5/122* (2013.01); *F16P 1/02* (2013.01); *B23K 2101/28* (2018.08); *B23K 2101/32* (2018.08); *B23K 2103/04* (2018.08)

(58) Field of Classification Search
CPC ...... B23K 37/006; B23K 7/005; B23K 9/026; B23K 9/013; B23K 9/23; B23K 10/00; B23K 10/006; B23K 37/0241; E04C 5/122; F16P 1/02
See application file for complete search history.

(56) References Cited

U.S. PATENT DOCUMENTS

| | | | | |
|---|---|---|---|---|
| 5,854,461 A | * | 12/1998 | Sorenson | B23K 37/006 219/136 |
| 6,040,546 A | * | 3/2000 | Sorkin | B23K 9/0026 219/121.39 |

(Continued)

*Primary Examiner* — Scott R Kastler
(74) *Attorney, Agent, or Firm* — Adolph Locklar

(57) ABSTRACT

A spark absorbing system for use with a cutting torch, comprises a cap having at least one spark opening therethrough and a spark capture unit coupled to the cap and positioned to capture sparks passing through the spark opening. The spark capture unit may comprise a tube extending from the cap and may include an outlet and a flow-reduction element positioned between the cap and the outlet and/or a spark accumulator between the cap and the spark capture unit. The flow-reduction element may comprise at least one baffle, screen or mesh. The spark absorbing system may further include a spark ramp extending from the cap opposite the spark capture unit and/or a shield, which may define a cutting space between the shield and the cap.

13 Claims, 5 Drawing Sheets

Related U.S. Application Data

(60) Provisional application No. 62/485,483, filed on Apr. 14, 2017.

(51) Int. Cl.
  *B23K 103/04* (2006.01)
  *B23K 101/28* (2006.01)
  *B23K 101/32* (2006.01)

(56) References Cited

U.S. PATENT DOCUMENTS

| | | | | |
|---|---|---|---|---|
| 6,380,508 B1 * | 4/2002 | Sorkin | ............... | B23K 7/10 219/121.39 |
| 8,272,557 B1 * | 9/2012 | Fikes | ............... | B23K 37/006 228/59 |
| 8,286,720 B1 * | 10/2012 | Moyer | ............... | A62C 8/08 169/48 |
| 10,639,750 B2 * | 5/2020 | Sorkin | ............... | B23K 7/005 |
| 2018/0297155 A1 * | 10/2018 | Sorkin | ............... | B23K 9/013 |

* cited by examiner

SPARK CAPTURE SYSTEM FOR USE WITH CUTTING TORCH

CROSS-REFERENCE TO RELATED APPLICATIONS

This application is a continuation application that claims priority to U.S. application Ser. No. 15/952,903, filed Apr. 13, 2018, now U.S. Pat. No. 10,639,750, issued May 5, 2020, which is a non-provisional application which claims priority from U.S. provisional application No. 62/485,483, filed Apr. 14, 2017, which is incorporated by reference herein in its entirety.

TECHNICAL FIELD/FIELD OF THE DISCLOSURE

The present disclosure relates generally to an apparatus and method for containing sparks emitted during a cable cutting process. More particularly, the present disclosure relates to a spark capture system for use with a cutting torch.

BACKGROUND OF THE DISCLOSURE

Cutting torches are frequently used to cut metal, including metal cables. Some of the applications in which it may be desired to cut metal include, but are not limited to, concrete members that may include tensioning strands, rebar, or the like.

Many structures are built using concrete, including, for instance, buildings, parking structures, apartments, condominiums, hotels, mixed-use structures, casinos, hospitals, medical buildings, government buildings, research/academic institutions, industrial buildings, malls, bridges, pavement, tanks, reservoirs, silos, foundations, sports courts, and other structures.

Prestressed concrete is structural concrete in which internal stresses are introduced to reduce potential tensile stresses in the concrete resulting from applied loads; prestressing may be accomplished by post-tensioned prestressing. In post-tensioned prestressing, a tension member is tensioned after the concrete has attained a specified strength by use of a post-tensioning tendon. The post-tensioning tendon may include anchors, the tension member, and sheathes or ducts. A tension member is conventionally constructed of a material having sufficient tensile strength that can also be elongated. Tension members are conventionally formed from a strand and a sheath. The strand is conventionally formed as a single or multi-strand metal cable. The strand is conventionally encapsulated within a polymeric sheath extruded thereabout to, for example, prevent or retard corrosion of the metal strand by protecting the metal strand from exposure to corrosive or reactive fluids. Likewise, the sheath may prevent or retard concrete from bonding to the strand and preventing or restricting movement of the sheath during post-tensioning. The sheath may be filled with grease to further limit the exposure of the metal strand and allow for increased mobility. The post-tensioning tendon conventionally includes an anchorage at each end. The tension member is fixedly coupled to a fixed anchorage positioned at one end of the post-tensioning tendon, the so-called "fixed-end", and stressed at the other anchor, the "stressing-end" of the post-tensioning tendon.

The concrete may be poured into a concrete form. The concrete form may be a form or mold into which concrete is poured or otherwise introduced to give shape to the concrete as it sets or hardens thus forming the concrete member. The post-tensioning tendon may be positioned within the concrete form, the concrete poured, and the concrete member then stressed to form a concrete segment. After the concrete member is stressed, the tension member extends beyond the edge of the concrete segment. In some cases, a pocket former is placed around the strand before the concrete is poured, which results in a pocket in the cured concrete. The end of the strand extends outwardly from the concrete and, if a pocket former was used, the end of the strand extends through and outwardly from the pocket. Conventionally, at least a portion of the strand that extends beyond the edge of the concrete member is cut, such as by a cutting torch. If a pocket former was used, the cutting of the strand may take place in the pocket.

Cutting torches generate sparks during the process of cutting the strand. Sparks generated by cutting torches may cause fires in nearby flammable materials. Such fires may result in damage, danger to personnel, delays, and increased monitoring costs.

SUMMARY

A spark absorbing system for use with a cutting torch may comprise a cap having at least one spark opening therethrough and a spark capture unit. The spark capture unit may be coupled to the cap and positioned to capture sparks passing through the spark opening. The spark capture unit may comprise a tube extending from the cap. The spark capture unit includes an outlet and may include a flow-reduction element positioned between the cap and the outlet. The flow-reduction element may comprise at least one baffle, screen or mesh. The spark absorbing system may further include a spark accumulator between the cap and the spark capture unit, a spark ramp extending from the cap opposite the spark capture unit, and/or a shield and generally parallel to the cap so as to define a cutting space between the shield and the cap.

The cap may comprise one or more layers of mesh screens, which may be generally parallel.

In some embodiments, a system for cutting a strand in a concrete segment having an end, a pocket at the end, and a strand extending from the pocket may include a cutting torch including a cutting head and a spark absorbing system supported on the cutting torch. The spark absorbing system may comprise a cap having at least one spark opening therethrough and a spark capture unit that may be coupled to the cap and positioned to capture sparks passing through the spark opening. The spark capture unit may be a tube extending from the cap. The spark capture unit may include an outlet and a flow-reduction element positioned between the cap and the outlet and the flow-reduction element may include at least one baffle, screen or mesh.

The spark absorbing system may further include a spark accumulator between the cap and the spark capture unit, a spark ramp extending from the cap opposite the spark capture unit and positioned to receive sparks emitted at the cutting head, and a shield coupled to the spark ramp and generally parallel to the cap so as to define a cutting space between the shield and the cap, with the cutting head in the cutting space.

In some embodiments, a process may include the steps of supplying a concrete segment, the concrete segment having an end, the concrete segment having a pocket at the end; extending a strand through the pocket; providing a cutting torch having a cutting head and a spark absorbing system coupled thereto, the spark absorbing system comprising a cap having at least one spark opening therethrough and a spark capture unit coupled to the cap and positioned to capture sparks passing through the spark opening; placing the cutting head in the pocket; operating the cutting torch; and capturing or deflecting sparks generated from the cutting torch using the spark absorbing system. In some embodiments, the cap may enclose the pocket and the spark absorbing system may extend outwardly therefrom.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
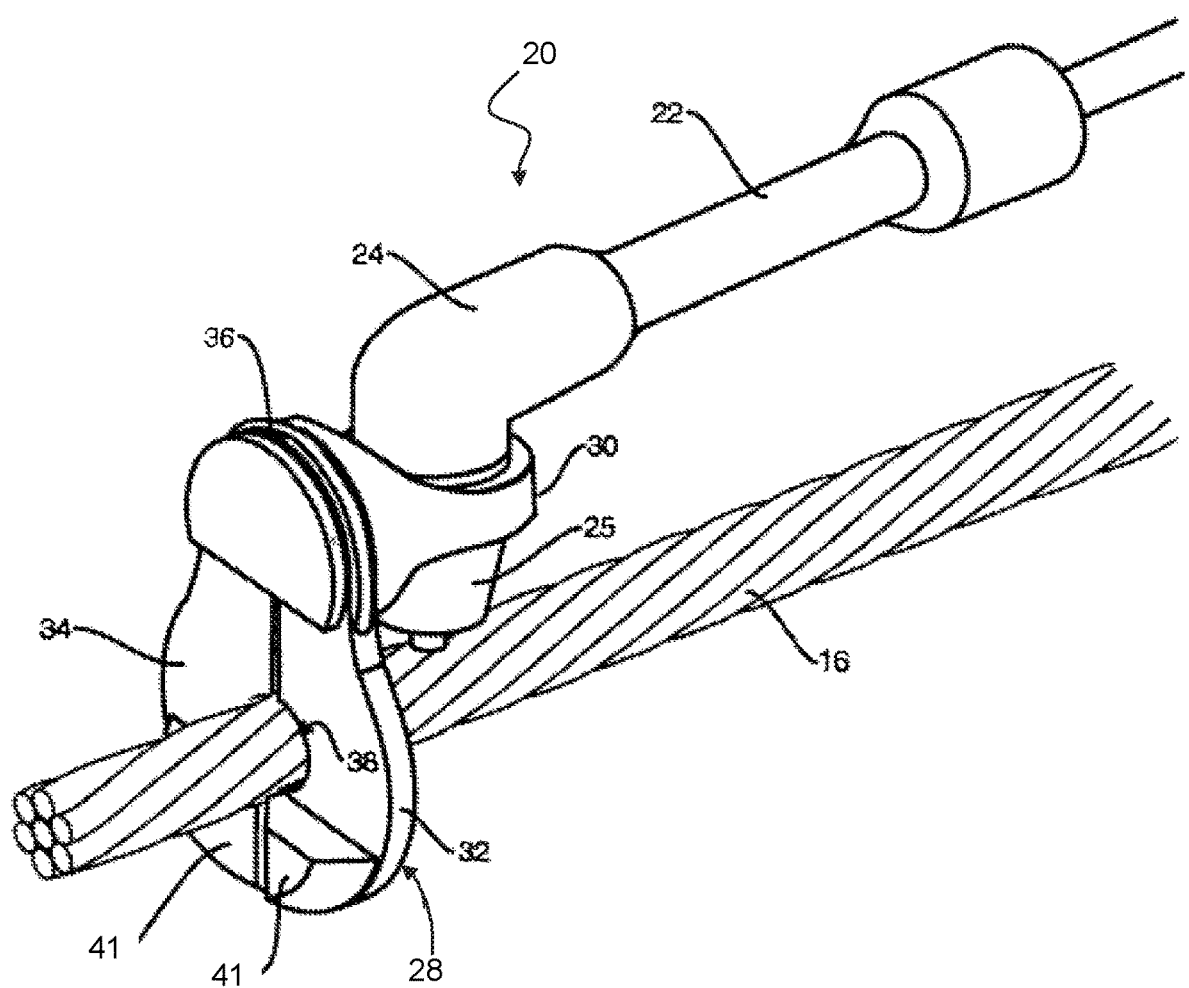
FIG. 1 is a detailed view of a prior art cutting torch.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals or letters in the various examples. This repetition is for the purpose of simplicity and clarity and does not in itself dictate a relationship between the various embodiments or configurations discussed.

"Coupled" for purposes of this disclosure, may include any form of coupling, including but not limited to "mechanical coupling." "Mechanically coupled" for purposes of this disclosure, may include, but not be limited to, threaded couplings, press fitting, mechanical welding, chemical welding, friction welding, thermal coupling or welding, electrical welding, optical welding, or beam-energy welding.

As depicted in FIG. 1, a cutting torch 20 may be used for a cutting strand 16. In certain embodiments, cutting torch 20 may be a plasma cutting torch or may use a gas source, such as a source of air, nitrogen, argon or oxygen, and an electrical power source and electrodes to generate a stream of air, nitrogen or other gaseous at temperatures sufficient to cut strand 16, for example and without limitation, from about 3,000° C.-5,000° C. or more.

While the present disclosure is presented in the context of use with a cutting torch, it will be understood that the spark absorbing systems described herein can be used advantageously with any strand-cutting device that generates sparks, including but not limited to oxy-cutting torches fueled with acetylene, propane, or stabilized mixtures of methylacetylene (propyne) and propadiene.

Cutting torch 20 may include a handle 22, a head 24, and a cutting tip 26. A heat shield 25 may surround at least a portion of cutting tip 26. Heat shield 25 may be formed of, for example, ceramic. Cutting torch 20 may also include a compressor, cylinder or other source (not shown) for the gas to be formed into the plasma, a source of electrical power (not shown) and an electrode (not shown) for converting the gas into a gaseous plasma. The electrode may be disposed in handle 22, head 24, or in another portion of cutting torch 20. In certain embodiments, cutting torch 20 may include an electrical ground. The electrical ground may include, but not be limited to a metal or other conductive element that touches strand 16. In other embodiments, the ground may be clamp 28, as described hereinbelow. A superheated stream of gaseous plasma is discharged from cutting tip 26. During cutting, cutting tip 26 is positioned near strand 16.

Clamp 28 may be releasably coupled to strand 16, such as through bracket 30. Bracket 30 may be coupled to head 24 of cutting torch 20. Bracket 30 may be sized to be friction fitted around head 24 or may be permanently attached to head 24 or heat shield 25. In some embodiments, positioners may be attached to bracket 30 so as to position cutting tip 26 at a predetermined distance from anchor 14 along the longitudinal axis of strand 16. In certain embodiments, the positioners may be a pair of depending jaws 32, 34. In some embodiments, depending jaws 32, 34 may be pivotally attached to bracket 30 and may be biased towards a closed position by a biasing mechanism 36, such as a spring clip. Each of depending jaws 32, 34 may include a semicircular relieved portion 38 on its inner edge. When depending jaws 32, 34 are closed, jaws 32 may abut jaw 34 and semicircular relieved portions 38 may form a circular opening through which the strand 16 may be received. The bottom portion of each depending jaw 32, 34 may include a sloping area 41. Sloping area 41 may serve to force jaws 32, 34 apart when jaws 32, 34 are pushed against tension a strand 16. Once strand 16 is received within the circular opening, depending jaws 32, 34 may close around strand 16.

When cutting torch 20 is to be used, jaws 32, 34 may be positioned around the strand 16. Jaws 32, 34 may be biased into a closed position by biasing mechanism 36. Jaws 32, 34, with head 24 attached pivotally thereto by the bracket 30, may be moved longitudinally along strand 16 until depending jaws 32, 34 are in position. Cutting tip 26 may then be positioned both angularly and longitudinally about strand 16 and anchor 14 for cutting the strand 16.

In certain embodiments, strand 16 may be encased by a sheath. As depicted in FIG. 1, the sheath has been removed prior to placement of clamp 28. In other embodiments, clamp 28 may be placed over the sheath.

Figure 2:
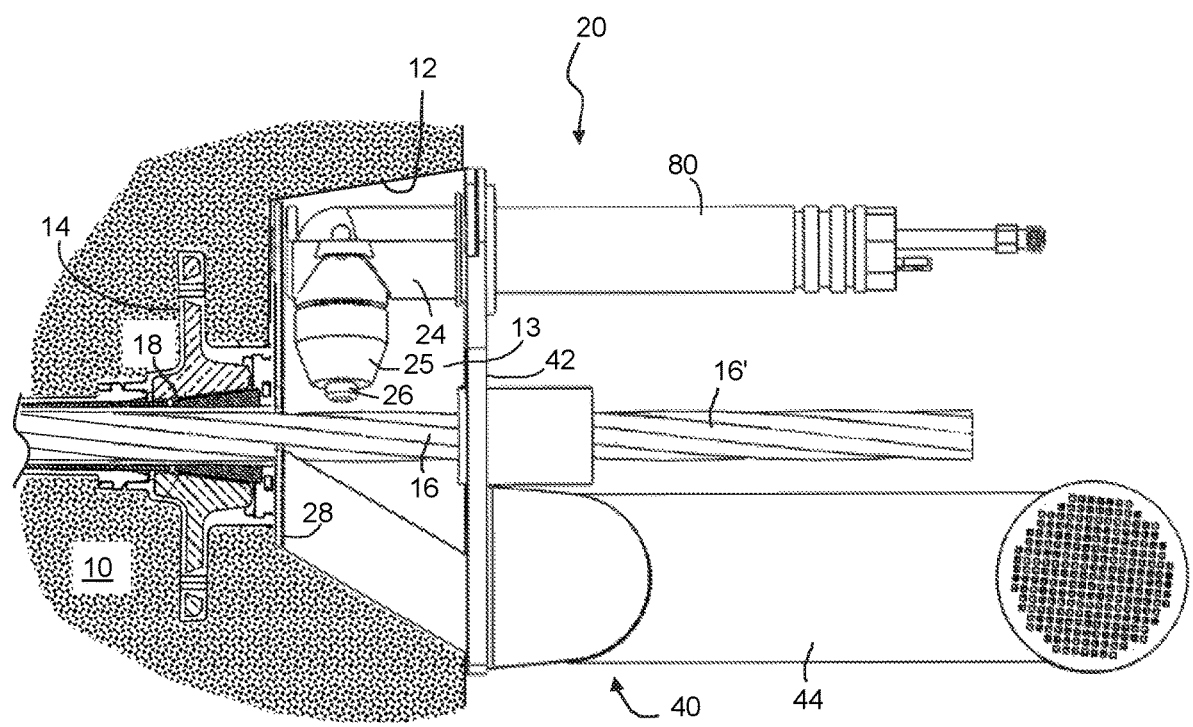
FIG. 2 is a cross-sectional view of a cutting torch with a spark absorbing unit consistent with certain embodiments of the present disclosure received in a pocket in a concrete member.

Referring now to FIG. 2, a concrete segment 10 may be part of a concrete member that is to be post-tensioned. Concrete segment may or may not include a pocket 12, which may be formed in the end of concrete segment 10. An anchor 14 may be positioned about strand 16. Strand 16 may be held in place by wedges 18 seated within anchor 14. A tensioning end 16' of strand 16 may extend through pocket 12, if present, and outwardly from concrete segment 10.

A cutting torch 20 is shown in pocket 12. Elements of the cutting torch 20 may be located within pocket 12, including, but not limited to, head 24, clamp 28, heat shield 25, and cutting tip 26. A gas supply 80 is depicted as outside pocket 12. As shown in FIG. 2, a spark absorbing system 40 may be included with, coupled to, and/or supported by or on cutting torch 20 and portions thereof may also be received within pocket 12.

Figure 3:
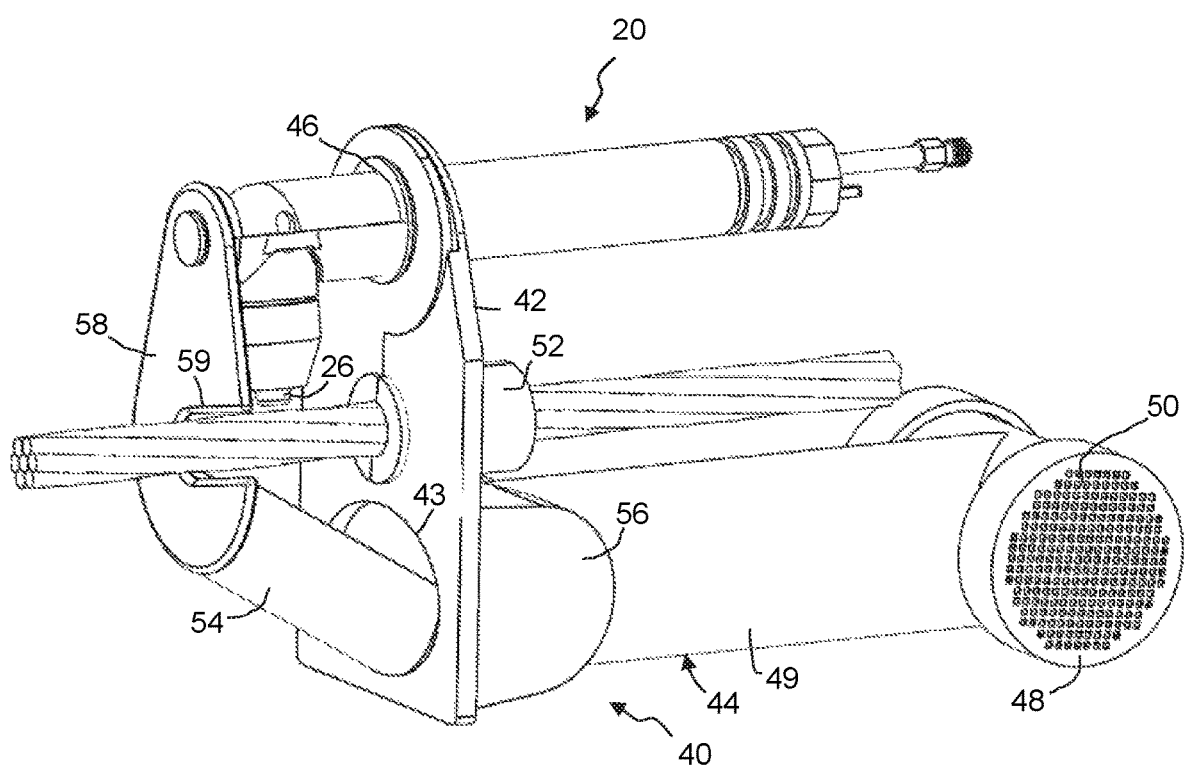
FIGS. 3 and 4 are orthographic views of the cutting torch and spark absorbing unit of FIG. 2.
Figure 4:
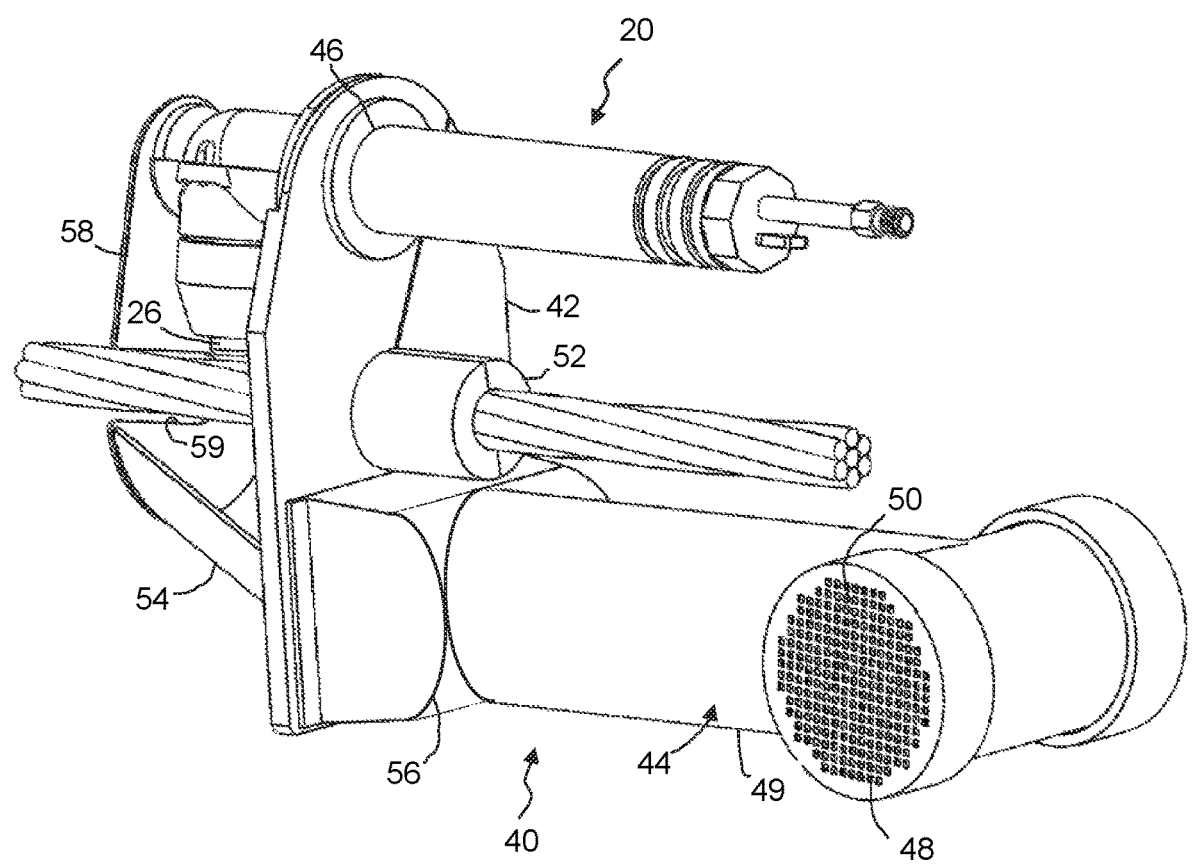

Referring now to FIGS. 3 and 4, in the embodiment shown, spark absorbing system 40 may include a cap 42, a strand ground shroud 52, a spark ramp 54, a spark accumulator 56, and a spark capture unit 44.

In the embodiment of FIGS. 3 and 4, clamp 28 is replaced with a shield 58. Shield 58 is optional and may be omitted or replaced with a clamp 28 or other member. Shield 58 may be a single flat piece having a size and shape corresponding generally to the size and shape of the inner face of concrete pocket 12. In some embodiments, a notch 59 is provided in shield 58 to facilitate installation of spark absorbing system 40 onto the strand end 16'. Shield 58 may be generally parallel to cap 42 so that a cutting space is defined between the shield 58 and the cap 42. In some embodiments, the shape of shield 58 may correspond to the shape of pocket 12 and if the anchor is encapsulated in a polymeric encapsulation layer, shield 58 may prevent sparks from reaching the anchor encapsulation layer.

Cap 42 is optional. Cap 42 may be a barrier, such as a plate or may have a curved or enclosing surface. Cap 42 may be positioned at least partially and, in some embodiments, completely within pocket 12, or may extend across the opening of pocket 12 and abut the outer surface of the concrete that forms pocket 12. In some embodiments, cap 42 encloses pocket 12 such that a chamber 13 is defined generally by cap 42, the walls of pocket 12, and either the floor of pocket 12 or, if present, shield 58. Cap 42 may be constructed of metal, ceramic, or heat-resistant plastic, for example, and may include spark opening 43 and handle aperture 46 therethrough. Handle aperture 46 may be adapted to allow handle 22 to pass through cap 42. Thus, cap 42 may engage or be coupled to and/or supported by or on cutting torch 20. If a spark ramp 54 is present, cap 42 may also or alternatively be coupled to and/or supported by or on spark ramp 54. Cap 42 may be formed from one, two, or more solid pieces, as shown, may be formed from mesh as described below, or may comprise any other structure that reduces the outward flow of sparks. In embodiments where the concrete member does not include a pocket, either shield 58 or cap 42 may optionally extend fully or partially around the sides of the cutting torch head.

Strand ground shroud 52 is optional. Strand ground shroud 52 forms a grounded electrical (conducting) contact between strand end 16' and a ground. The ground may be provided via the concrete, via the electrical systems of cutting torch 20, via a dedicated electrical conductor in contact with the earth, or by any other suitable ground.

Spark ramp 54 is optional. If present, spark ramp 54 may be a channel-shaped piece that extends between the shield 58 and the cap 42, on the opposite side of strand 16 from torch cutting tip 26. In this location, spark ramp 54 is configured to divert gas and sparks emitted during the cutting process and direct the sparks toward spark opening 43, through which the sparks may enter spark capture unit 44. If spark ramp 54 is omitted, the inner wall of concrete pocket 12 may serve the same purpose.

Spark accumulator 56 is optional. If present, spark accumulator 56 may be a chamber adjacent to spark opening 43 positioned such that sparks passing through spark opening 43 enter spark accumulator 56. In some embodiments, the volume of spark accumulator 56 relative to the size of spark opening 43 may cause the velocity of gas flowing through spark absorbing system 40 to drop, causing particles entrained in the gas flow to fall out and collect on the floor of spark accumulator 56.

Spark capture unit 44 may include an arrester tube 49 that is connected at one end to spark accumulator 56 and has at its opposite end one or more outlets 50 that may each optionally be enclosed by a mesh screen 48. Spark capture unit 44 may serve to capture and/or deflect sparks, preventing or restricting sparks from exiting pocket 12 through outlets 50. Spark capture unit 44 may allow gas from gas source 80 to pass through outlets 50. In certain embodiments, spark capture unit 44 may be a generally cylindrical or polygonal extension from cap 42. Spark capture unit 44 may be releasably attached to or integrally formed with cap 42 or may be releasably attached to or integrally formed with cutting torch 20.

Figure 5:
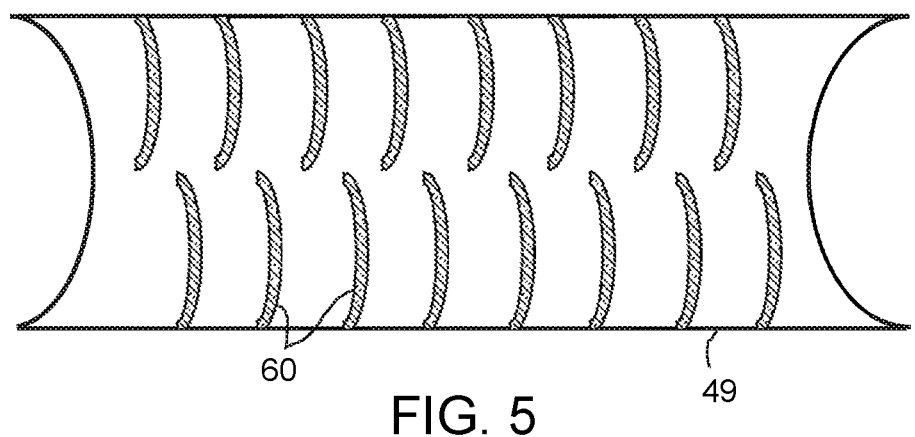
FIGS. 5-7 are each a cross-sectional view of a portion of a spark absorbing unit consistent with certain embodiments of the present disclosure.
Figure 6:
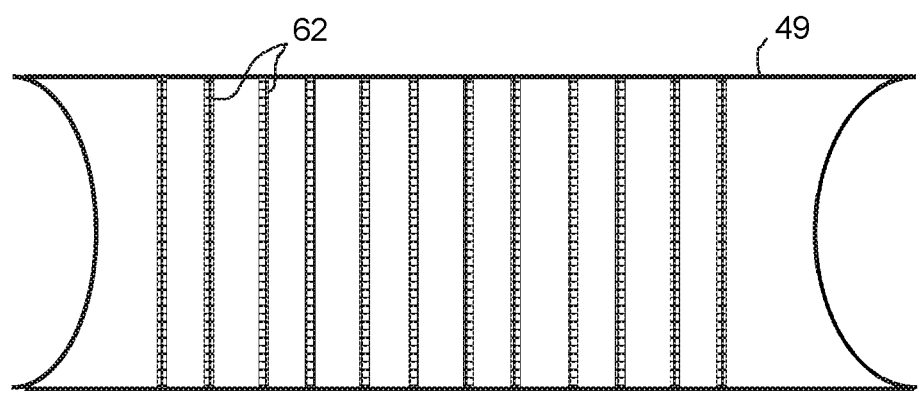
Figure 7:
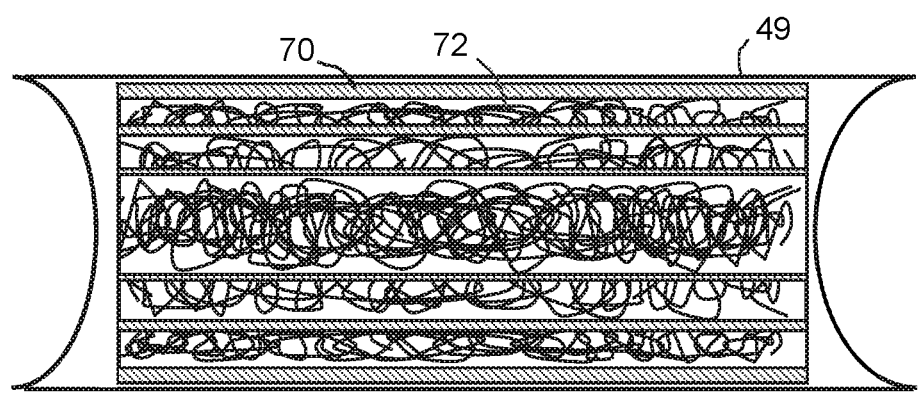

In some embodiments, arrester tube 49 may comprise a hollow tube. In other embodiments, arrester tube 49 may contain one or more flow-reduction elements, including but not limited to the exemplary flow-reduction elements illustrated in FIGS. 5-7. In the embodiment shown in FIG. 5, the flow-reduction element of spark capture unit 44 may include one or more baffles 60. In the embodiment shown in FIG. 6, the flow-reduction element of spark capture unit 44 may include one or more mesh screens 62. In the embodiment shown in FIG. 7, the flow-reduction element of spark capture unit 44 may include one or more cylinders 70. When spark capture unit 44 includes more than one cylinder 70, cylinders 70 may be nested. In some embodiments, one or more of cylinders 70 may include mesh 72.

In still other embodiments, the cap 42 itself may include one or more mesh screens and may, in some embodiments, omit any or all of spark ramp 54, spark accumulator 56 and spark capture unit 44. Cap 42 acts to capture and/or deflect sparks, preventing or restricting sparks from passing through cap 42. In certain embodiments, cap 42 may comprise a plurality of layered mesh screens.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

What is claimed is:

1. A spark absorbing system, the spark absorbing system comprising:
   a cap having at least one spark opening therethrough;
   a shield, the shield positioned apart from the cap such that a cutting space is formed between the shield and the cap;
   a spark ramp, the spark ramp extending between the cap and the shield;
   a spark capture unit, the spark capture unit attached to or formed integrally with the cap, the spark capture unit including a spark opening, the spark capture unit including an arrester tube in communication with the spark opening.

2. The spark absorbing system of claim 1, wherein the spark capture unit further includes:
   an outlet; and
   a flow-reduction element positioned within the spark capture unit between the cap and the outlet and wherein the flow-reduction element comprises at least one baffle, screen or mesh.

3. The spark absorbing system of claim 1, wherein the cap is a plate or a curved surface.

4. The spark absorbing system of claim 1, wherein the spark opening in the cap is adjacent the spark capture unit.

5. The spark absorbing unit of claim 1, wherein the shield includes a notch adapted to pass a strand therethrough.

6. The spark absorbing unit of claim 1, wherein the spark ramp extends from the cap and is positioned to receive sparks emitted at a cutting head of a cutting torch and wherein the spark ramp is configured to divert gas and sparks emitted at the cutting torch toward the spark opening.

7. The spark absorbing unit of claim 1, wherein the spark ramp is channel shaped.

8. The spark absorbing unit of claim 1 further including a spark accumulator positioned between the cap and the spark capture unit, wherein spark accumulator comprises a chamber adjacent to the spark opening.

9. The spark absorbing unit of claim 1, wherein the cap comprises one or more mesh screens.

10. The spark absorbing unit of claim 1, wherein the arrester tube includes a plurality of baffles positioned within the arrester tube, each baffle extending partially across a diameter of the arrester tube.

11. The spark absorbing unit of claim 1, wherein the arrester tube includes a plurality of mesh screens, wherein each mesh screen extends across a diameter of the arrester tube.

12. The spark absorbing unit of claim 1, wherein the arrester tube includes a plurality of nested cylinders positioned longitudinally within the arrester tube.

13. The spark absorbing unit of claim 12, wherein one or more of the nested cylinders includes mesh.

\* \* \* \* \*